(12) United States Patent
Dunmire et al.

(10) Patent No.: US 10,832,259 B2
(45) Date of Patent: *Nov. 10, 2020

(54) METHODS AND APPARATUS TO PROVIDE AN ELECTRONIC AGENT

(71) Applicant: AT&T Intellectual Property I, L.P., Atlanta, GA (US)

(72) Inventors: David Dunmire, San Antonio, TX (US); Brian Novack, St. Louis, MO (US); Chad C. Keith, St. Louis, MO (US); Jeff Clark, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/940,538

(22) Filed: Mar. 29, 2018

(65) Prior Publication Data
US 2018/0285889 A1    Oct. 4, 2018

Related U.S. Application Data

(63) Continuation of application No. 11/426,206, filed on Jun. 23, 2006, now Pat. No. 9,940,626.

(51) Int. Cl.
*G06Q 30/00* (2012.01)
*H04L 29/06* (2006.01)
(Continued)

(52) U.S. Cl.
CPC ......... *G06Q 30/02* (2013.01); *G06Q 30/0257* (2013.01); *H04L 29/06027* (2013.01);
(Continued)

(58) Field of Classification Search
CPC .............. G06Q 30/02; H04L 29/06027; H04L 65/4076; H04L 67/306; H04N 21/4312
(Continued)

(56) References Cited

U.S. PATENT DOCUMENTS 4,745,468 A    5/1988  Von Kohorn
4,876,592 A    10/1989 Von Kohorn
(Continued)

FOREIGN PATENT DOCUMENTS

WO    02061652    8/2002
WO    2006025797  3/2006
(Continued)

OTHER PUBLICATIONS

Michael Fink, Center for Neural Computation, Hebrew University of Jerusalem, Michele Covell and Shumeet Baluja, Google Research, Social- and Interactive-Television Applications Based on Real-Time Ambient-D Audio Identification, 10 pages.

(Continued)

*Primary Examiner* — Sun M Li (57) ABSTRACT

Methods and apparatus to provide an electronic agent are disclosed. An example apparatus includes a media receiver to receive media to present via a display device. A media monitor is to determine an identity of the media. A keyword handler is to, in response to identity of the media, retrieve a list including a keyword associated with the identified media. The keyword handler is to access a first database using the keyword to retrieve an advertisement associated with the keyword. An agent generator is to present an interactive electronic agent on the display device to present the advertisement. The presentation of the interactive electronic agent including presentation of spoken audio corresponding to text presented on the display device.

20 Claims, 9 Drawing Sheets

(51) Int. Cl.
*H04N 21/431* (2011.01)
*G06Q 30/02* (2012.01)
*H04L 12/58* (2006.01)
*H04N 7/173* (2011.01)
*H04N 21/439* (2011.01)
*H04N 21/4722* (2011.01)
*H04N 21/4788* (2011.01)
*H04N 21/61* (2011.01)
*H04N 21/81* (2011.01)
*H04N 21/8405* (2011.01)
*H04L 29/08* (2006.01)
*H04N 21/478* (2011.01)

(52) U.S. Cl.
CPC .......... *H04L 51/04* (2013.01); *H04L 65/4076* (2013.01); *H04L 67/306* (2013.01); *H04N 7/17318* (2013.01); *H04N 21/4312* (2013.01); *H04N 21/4314* (2013.01); *H04N 21/4394* (2013.01); *H04N 21/4722* (2013.01); *H04N 21/4788* (2013.01); *H04N 21/6125* (2013.01); *H04N 21/8106* (2013.01); *H04N 21/8405* (2013.01); *H04N 21/478* (2013.01)

(58) Field of Classification Search
USPC .................................. 705/14.4, 14.73, 14.49
See application file for complete search history.

(56) References Cited

U.S. PATENT DOCUMENTS

| | | | |
|---|---|---|---|
| 4,926,255 | A | 5/1990 | Von Kohorn |
| 5,034,807 | A | 7/1991 | Von Kohorn |
| 5,057,915 | A | 10/1991 | Von Kohorn |
| 5,227,874 | A | 7/1993 | Von Kohorn |
| 5,283,734 | A | 2/1994 | Von Kohorn |
| 5,524,195 | A | 6/1996 | Clanton, III et al. |
| 5,697,844 | A | 12/1997 | Von Kohorn |
| 5,713,795 | A | 2/1998 | Von Kohorn |
| 5,759,101 | A | 6/1998 | Von Kohorn |
| 5,841,978 | A | 11/1998 | Rhoads |
| 5,916,024 | A | 6/1999 | Von Kohorn |
| 6,154,209 | A | 11/2000 | Naughton et al. |
| 6,286,036 | B1 | 9/2001 | Rhoads |
| 6,335,736 | B1 | 1/2002 | Wagner et al. |
| 6,363,159 | B1 | 3/2002 | Rhoads |
| 6,443,840 | B2 | 9/2002 | Von Kohorn |
| 6,505,160 | B1 | 1/2003 | Levy et al. |
| 6,539,095 | B1 | 3/2003 | Rhoads |
| 6,654,480 | B2 | 11/2003 | Rhoads |
| 6,795,972 | B2 | 9/2004 | Rovira |
| 6,829,368 | B2 | 12/2004 | Meyer et al. |
| 6,853,634 | B1 | 2/2005 | Davies et al. |
| 6,871,323 | B2 | 3/2005 | Wagner et al. |
| 6,956,575 | B2 | 10/2005 | Nakazawa et al. |
| 6,968,315 | B1 | 11/2005 | Nakisa |
| 6,970,886 | B1 | 11/2005 | Conwell et al. |
| 7,003,731 | B1 | 2/2006 | Rhoads et al. |
| 7,050,603 | B2 | 5/2006 | Rhoads et al. |
| 7,051,086 | B2 | 5/2006 | Rhoads et al. |
| 7,058,697 | B2 | 6/2006 | Rhoads |
| 7,095,871 | B2 | 8/2006 | Jones et al. |
| 7,171,018 | B2 | 1/2007 | Rhoads et al. |
| 7,197,156 | B1 | 3/2007 | Levy |
| 7,254,249 | B2 | 8/2007 | Rhoads et al. |
| 7,317,716 | B1 | 1/2008 | Boni et al. |
| 7,421,723 | B2 | 9/2008 | Harkness et al. |
| 2002/0032734 | A1 | 3/2002 | Rhoads |
| 2002/0056094 | A1 | 5/2002 | Dureau |
| 2002/0062382 | A1 | 5/2002 | Rhoads et al. |
| 2002/0087978 | A1 | 7/2002 | Nicholson et al. |
| 2002/0108125 | A1 | 8/2002 | Joao |
| 2002/0111154 | A1* | 8/2002 | Eldering ............. H04M 3/4872 455/414.1 |
| 2002/0143753 | A1 | 10/2002 | Kawase |
| 2002/0162118 | A1 | 10/2002 | Levy et al. |
| 2003/0021441 | A1 | 1/2003 | Levy et al. |
| 2003/0097301 | A1* | 5/2003 | Kageyama ............. G06Q 30/02 705/14.52 |
| 2003/0185232 | A1 | 10/2003 | Moore et al. |
| 2004/0037271 | A1 | 2/2004 | Liscano et al. |
| 2005/0058319 | A1 | 3/2005 | Rhoads et al. |
| 2005/0137958 | A1 | 6/2005 | Huber |
| 2005/0144004 | A1 | 6/2005 | Bennett et al. |
| 2005/0192933 | A1 | 9/2005 | Rhoads et al. |
| 2005/0216346 | A1 | 9/2005 | Kusumoto et al. |
| 2006/0136564 | A1 | 6/2006 | Ambrose |
| 2006/0167747 | A1 | 7/2006 | Goodman et al. |
| 2007/0198738 | A1* | 8/2007 | Angiolillo ............... H04L 51/04 709/231 |
| 2008/0028223 | A1 | 1/2008 | Rhoads |
| 2008/0139182 | A1 | 6/2008 | Levy et al. |
| 2008/0140573 | A1 | 6/2008 | Levy et al. |

FOREIGN PATENT DOCUMENTS

| | | |
|---|---|---|
| WO | 2007056531 | 5/2007 |
| WO | 2007056532 | 5/2007 |
| WO | 2008110790 | 9/2008 |

OTHER PUBLICATIONS

Nate Anderson, Google to compete with Nielsen for TV-ratings info?, http://arstechnica.com/old/content/2006/0617081.ars, last updated Jun. 19, 2006, 2 pages.

Thomas Claburn, Google Researchers Propose TV Monitoring, InformationWeek, http://informationweek.com/news/internet/showArticle.jhtml?articleID=188702619, Jun. 7, 2006, 3 pages.

Yukari Iwatani Kane, Entrepreneur Plans On-Demand Videogame Service, The Wall Street Journal, http://online/wsj_com/article/SB123787473566622741_html#printMode, Mar. 24, 2009, 2 pages.

Katherine Boehret, Yahoo Widgets Lend Brains to Boob Tube, The Wall Street Journal, http:/fonline.wsj.com/article/SB123793255493230821_html#printMode, Mar. 25, 2009, 3 pages.

United States Patent and Trademark Office, "Non-Final Office Action," issued in connection with U.S. Appl. No. 11/426,206, dated Dec. 22, 2008, 16 pages.

United States Patent and Trademark Office, "Non-Final Office Action," issued in connection with U.S. Appl. No. 11/426,206, dated Dec. 9, 2009, 20 pages.

United States Patent and Trademark Office, "Non-Final Office Action," issued in connection with U.S. Appl. No. 11/426,206, dated Jun. 6, 2013, 20 pages.

United States Patent and Trademark Office, "Non-Final Office Action," issued in connection with U.S. Appl. No. 11/426,206, dated Mar. 24, 2014, 22 pages.

United States Patent and Trademark Office, "Non-Final Office Action," issued in connection with U.S. Appl. No. 11/426,206, dated Aug. 12, 2014, 6 pages.

United States Patent and Trademark Office, "Notice of Allowance," issued in connection with U.S. Appl. No. 11/426,206, dated Jul. 2, 2014, 11 pages.

United States Patent and Trademark Office, "Notice of Allowance," issued in connection with U.S. Appl. No. 11/426,206, dated Dec. 14, 2017, 23 pages.

United States Patent and Trademark Office, "Final Office Action," issued in connection with U.S. Appl. No. 11/426,206, dated Jul. 21, 2009, 16 pages.

United States Patent and Trademark Office, "Final Office Action," issued in connection with U.S. Appl. No. 11/426,206, dated Jan. 20, 2011, 14 pages.

United States Patent and Trademark Office, "Final Office Action," issued in connection with U.S. Appl. No. 11/426,206, dated Dec. 2, 2013, 22 pages.

United States Patent and Trademark Office, "Final Office Action," issued in connection with U.S. Appl. No. 11/426,206, dated Nov. 25, 2014, 11 pages.

(56) References Cited

OTHER PUBLICATIONS

United States Patent and Trademark Office, "Examiner's Answer to Appeal Brief," issued in connection with U.S. Appl. No. 11/426,206, dated May 5, 2015, 10 pages.

\* cited by examiner

METHODS AND APPARATUS TO PROVIDE AN ELECTRONIC AGENT

RELATED APPLICATION

This patent arises from a continuation of U.S. patent application Ser. No. 11/426,206, which was filed on Jun. 23, 2006, and entitled "METHODS AND APPARATUS TO PROVIDE AN ELECTRONIC AGENT." Priority to U.S. patent application Ser. No. 11/426,206 is hereby claimed. U.S. patent application Ser. No. 11/426,206 is hereby incorporated herein by reference in its entirety.

FIELD OF THE DISCLOSURE

The present disclosure relates generally to media systems and, more particularly, to methods and apparatus to provide an electronic agent.

BACKGROUND

Interactive television services enable consumers to be more closely involved in the television consumption experience. In general, interactive television services enable two-way communication with a consumer location (e.g., a household). For example, interactive television services enable a consumer to request information and to submit information from/to an interactive television distribution network. One implementation of an interactive television service is an internet protocol television (IPTV) service.

IPTV services provide television media content over a broadband network. In general, an IPTV provider receives media content from media content creators. The IPTV provider converts the media content into packetized digital media streams. The packetized digital media streams are distributed to consumer locations via an internet protocol (IP) multicast or an IP unicast. The consumer location includes a consumer device that receives the packetized digital media streams and converts the streams into media content suitable for display on a display device such as a television or computer. Because the consumer device communicates with the IPTV provider over an IP connection, the consumer device can easily transmit data back to the IPTV provider. In other words, the IPTV provider and the consumer device can engage in two-way communication.

DETAILED DESCRIPTION

Methods and apparatus to provide an electronic agent in a telecommunication system are described herein. An example method includes receiving an interactive television program via a network at a first information presenting device (e.g., a television receiver, set top box, etc.), accessing a list of keywords associated with the interactive program via the network (e.g., a television network, the Internet, etc.), accessing a first database using at least one of the keywords, and presenting an electronic agent on the first information presenting device (e.g., a television, a computer, etc.) to at least one of present information retrieved from the first database or offer to retrieve information identified via the first database.

Figure 1:
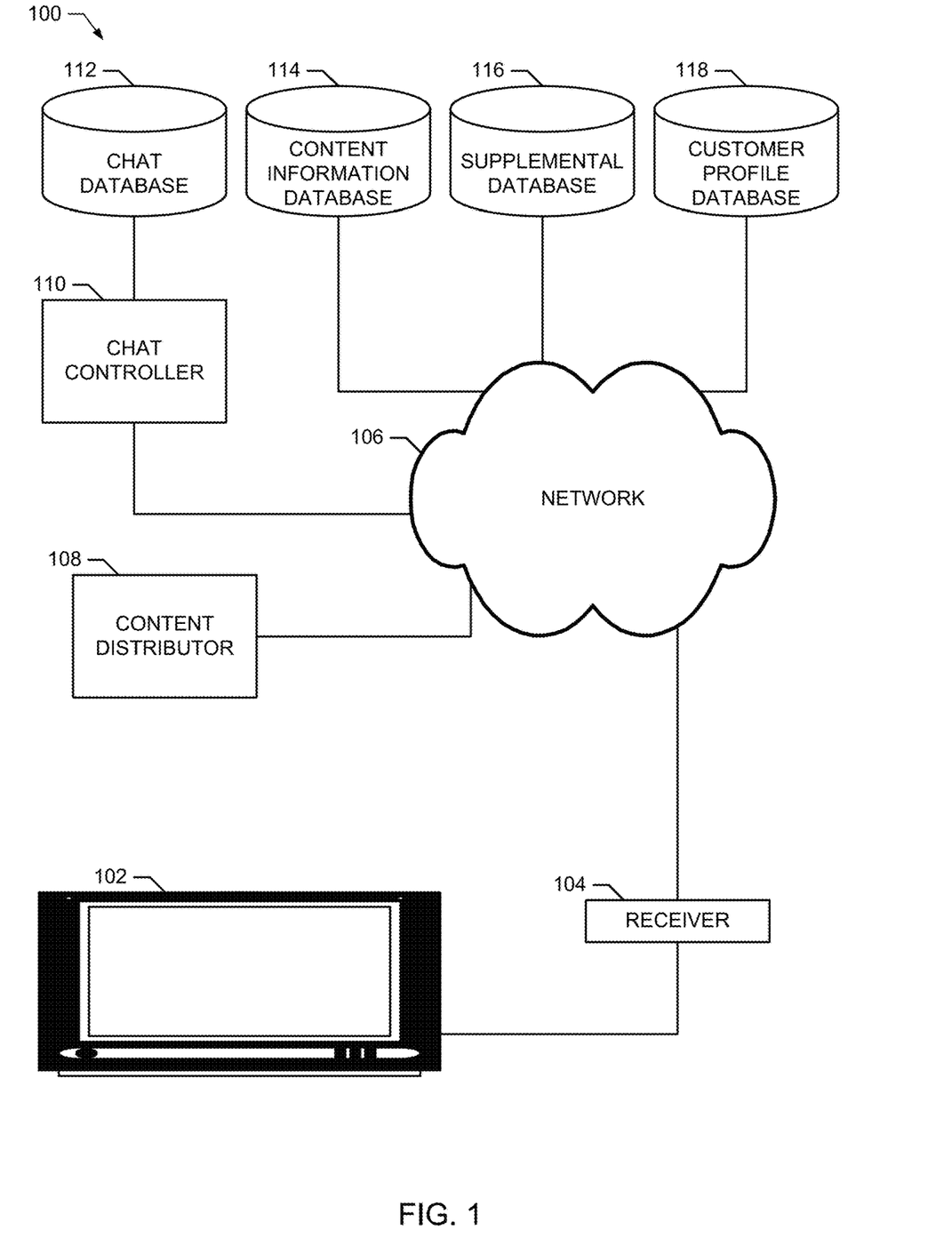
FIG. 1 is a block diagram of an example system for providing an electronic agent.

An example system 100 for providing an electronic agent is illustrated in FIG. 1. In general, the example methods and apparatus described herein may be used to provide an electronic agent to a media content consumer. In some example implementations, an electronic agent is an animated character displayed on a television screen that interacts with a consumer. An example consumer location includes an information presenting device (e.g., a receiver and/or a display device) that receives media content from a network and displays the media content on a television at the consumer location. While receiving media content, the example receiver determines the identity of the media content and requests information from the example network. The network includes one or more database(s) that include(s) information associated with the media content. The network retrieves the information associated with the media content and transmits it to the receiver at the consumer location. The example receiver receives the information and generates an animated character that includes the information. For example, the animated character may include a speech bubble that includes the received information. The information may be informational, may allow the consumer to submit input, and/or may allow the consumer to request further information. Alternatively, any other device attached to the network may be responsible for generating the animated character and transmitting the animated character to the information presenting device.

The example system 100 includes a display device 102, a receiver 104, a network 106, a content distributor 108, a chat controller 110, a chat database 112, a content information database 114, a supplemental database 116, and a customer profile database 118.

The display device 102 of the illustrated example displays media content received from the receiver 104. The example display device 102 of the illustrated example may be implemented by any type of television such as, for example, a standard definition television, an enhanced definition television, a high-definition television, a cathode ray tube (CRT) television, a liquid crystal display (LCD) television, a plasma television, a projection television, an organic light emitting diode (OLED) television, a surface-conduction electron-emitter display (SED) television, etc. Alternatively, the display device 102 may be implemented by any other device that is capable of receiving and presenting media content such as, for example, any type of radio receiver/player, a projector, a monitor, a computer, a portable media player (e.g., an iPod®), a desktop computer, a laptop computer, etc.

The receiver 104 of the illustrated example is an information presenting device that receives media content from the network 106 and outputs the media content to the display device 102. For example, a consumer may request (via a remote control) that the receiver 104 output the content currently presented on a specific channel (e.g., the Home Box Office (HBO®) channel). The receiver 104 will send a message (via a network interface) to the network 106 requesting that the network 106 send, for example, the HBO media content stream to the receiver 104 or allow the receiver 104 to connect to the HBO media content stream. When the receiver 104 of the illustrated example receives the HBO media content stream, the receiver 104 outputs the HBO media content stream to the display device 102. Alternatively, if the receiver 104 receives broadcast media content (e.g., a cable television broadcast), the receiver 104 of the illustrated example uses tuning circuitry to extract the HBO media content from the broadcast media content and output the HBO media content to the display device 102. The receiver 104 is sometimes referred to as a set-top-box (STB), a residential gateway (RG), an integrated receiver/decoder (IRD), or a tuner. The receiver 104 may alternatively be integrated in the display device 102 and/or the display device 102 may include a card-slot for receiving a card that implements the receiver 102. The receiver 104 may include conditional access circuitry to control access to media content (e.g., paid or subscription media content).

In addition to receiving and displaying media content, the receiver 104 is also configured to generate an electronic agent and output it for display on the display device 102. The electronic agent presents information to consumers and/or requests information from one or more consumers viewing the display of the display device 102. Electronic agents are sometimes referred to as avatars. In one example, the electronic agent is an animated character (e.g., a person, an animal, an animated object, etc.) Alternatively, the electronic agent may be one or more of displayed text, presented audio, displayed graphics, etc. In the illustrated example, to enable the agent to present instructions on the display device 102, the receiver retrieves and/or receives information from data sources available on the network 106. In particular, the receiver receives information from one or more of the chat database 112 (via the chat controller 110), the content database 114, the supplemental database 116, and/or the customer profile database 118. In alternative implementations, the receiver may additionally or alternatively receive and/or retrieve information from any available data source such as, for example, a data source located on the internet, an output stream of a software application, a data source located on a private network, a user input stream, a data source located on the receiver 104 (e.g., a database of user input information), etc. The receiver 104 is described in further detail in conjunction with FIG. 2.

The network 106 of the illustrated example is a network associated with an interactive television content distributor. For example, the example network 106 may be an internet protocol television (IPTV) network. The example network 106 facilitates communication between the receiver 104 and the content distributor 108, the chat controller 110, the chat database 112, the content information database 114, the supplemental database 116, and/or the customer profile database 118. In the illustrated example, the example network 106 includes a digital subscriber line (DSL) access module (DSLAM) for communicating with a residential gateway (RG) at a consumer location. The RG is communicatively coupled to the receiver 104. The example receiver 104 sends a request for media content to the network 106 via the RG and the DSLAM. The example network 106 receives the request and allows the receiver 104 to join a multicast stream of media content transmitted to the network 106 from the content distributor 108. Persons of ordinary skill in the art will recognize that the network 106 may alternatively be implemented as any other type of communication network such as, for example, a cable television distribution network, a satellite distribution television network, a radio distribution network, a wireless communication network, a wired communication network, a wide area network, a local area network, a public network, a private network, etc. In addition, the network 106 may comprise a combination of two or more communication networks (e.g., a public network and an IPTV distribution network).

The content distributor 108 of the illustrated example is an interactive media content distribution system. The example content distributor 108 receives media content from media content creators/producers (e.g., the HBO television network), processes the media content, and transmits the media content to the receiver 104 for display on the display device 102. The content distributor 108 may be any type of media content distributor such as, for example, an IPTV content distributor, a cable television content distributor, a satellite television content distributor, a radio content distributor, an internet media distributor, etc. In addition, the content distributor 108 may receive media content from any available source including locally produced media content (e.g., a video camera, a microphone, a computer, etc. located at the content distributor) and a externally produced media content.

The chat controller 110 of the illustrated example facilitates communication between two or more consumers. In the illustrated example, the chat controller 110 allows a first consumer using the receiver 104 to provide information to authenticate the identity of the first consumer. In addition, the chat controller 110 is capable of determining if two consumers are consuming the same media content (e.g., by receiving consumption information from the content distributor 108). The chat controller 110 may additionally store the information about chat communications such as, for example, the content of conversations between two or more consumers.

For example, the receiver 104 sends username and password information associated with the first consumer to the chat controller 110. Then, the example receiver 104 sends a query to the example chat controller 110 to determine if any other person (e.g., a second consumer) is consuming media content associated with media content currently being consumed at the receiver 104 by the first consumer. The chat controller 110 determines if the second consumer (e.g., a consumer identified by the receiver 104 or a consumer associated with the first consumer in the chat database 112) is consuming media content associated with the media content currently being consumed by the first consumer. If the chat controller 110 indicates that the second consumer is consuming media content associated with media content being consumed by the first consumer, the consumer is notified to enable the consumer to cause the receiver 104 to request that a chat session between the first consumer and the second consumer be initiated by the chat controller 110. The example chat controller responds to such a request by initiating a chat connection between the first consumer and the second consumer and/or by providing information (e.g., a network address of the second consumer) to the receiver 104 to enable the receiver 104 to initiate a chat connection (e.g., a direct connection). The second consumer may be another consumer connected to the network 106 or may be a consumer connected to another network. The second consumer may be authenticated with the chat controller 110 and/or the chat controller 110 may be associated with another chat controller/server, which authenticates the second consumer. While the second consumer of the illustrated example is a consumer identified by the receiver 104 and/or associated with the first consumer, the second consumer may alternatively be any available consumer (e.g., an "unknown" consumer that the first consumer has not communicated with in the past). The media content consumed by the second consumer and associated with the media content consumed by the first consumer may be the same or substantially the same media content and/or may have the same or substantially the same common actor(s)/actress(es), character(s), producer(s), plot, starting time, ending time, keyword(s), etc.

The chat database 112 of the illustrated example is communicatively coupled to the chat controller 110. The example chat database 112 stores chat consumer authentication information (e.g., usernames and passwords, network addresses, etc.) and/or chat buddy list information (e.g., usernames and/or aliases of other consumers that a consumer has pre-selected). The example chat database 112 receives queries for information from the chat controller 110 and returns the requested information to the controller 110. In the illustrated example, the chat database 112 is connected directly to the chat controller 110. However, the chat database 112 may alternatively be connected to the network 106.

The chat database 112 may be integrated with any other available database or data source. For example, the chat database 112 may be integrated with the customer profile database 118. The chat database 112 may be implemented using any type of data storage device such as, for example, a standalone database server, a database integrated with the chat controller 110, a file stored on a storage device of the chat controller 110, a file stored on a file server, etc and may implement any suitable database structure such as, for example, a structured query language (SQL) database.

The content information database 114 of the illustrated example stores keyword and content information (e.g., a title, a synopsis, a list of characters, a list of producers, etc.) associated with media content. For example, a media content program may be associated with a serial number. In the illustrated example, when the media content program creator transmits the media content program and the serial number to the content distributor 108, the media content creator may also provide keywords and content information associated with the media content program. The example content information database 114 stores the serial number of the media content program and associates the serial number with the keywords and content information supplied by the media content program creator. Later, if a receiver 104 sends a request, the keywords and/or content information associated with a media content program being consumed at the display device 102 are provided. In the illustrated example, the choice of keywords is at the discretion of the media content creator. Alternatively, the keywords associated with media content may be selected by the content distributor 108. The keywords may be associated with an advertisement displayed, a location or scene displayed, a topic discussed, a product displayed, discussed, and/or consumed, a character or actor/actress, etc. The keywords may additionally be associated with time indications that indicate what time during a presentation of media content a keyword should be presented in response to a request. In other words, a request for information at a first time would result in downloading of keywords associated with the first time, but not keywords associated with a second time and vice versa. The keywords may be any type of information (and may or may not be associated with media content) such as, for example, descriptions, titles, the name of products featured, identifiers associated with products, advertisements, links to other programming, etc.

The content information database 114 may be integrated with any other available database or data source. For example, the content information database 114 may be integrated with the supplemental database 116. The content information database 114 may be implemented using any type of data storage device such as, for example, a standalone database server, a database integrated with the content distributor 108, a file stored on a storage device of the content distributor 108, a file stored on a file server, etc. and may operate any kind of database including, for example an SQL database.

The supplemental database 116 of the illustrated example stores information associated with keywords/identifiers stored in the content information database 114. After retrieving a list of one or more keywords from the content information database 114, the receiver 104 of the illustrated example is structured to utilize one or more of those keywords to retrieve supplemental information from the supplemental database 116 for display using an electronic agent. One example implementation of the supplemental database 116 is the database for the YELLOWPAGES.COM® business directory. The supplemental database 114 may store any information. Any information may then be presented by the receiver 104 using an electronic agent. For example, the supplemental database 114 may store biographical information about one or more character(s) and/or actor(s)/actress(es), information about a location depicted in media content, information about a product depicted in the media content, information (e.g., information such as a local physical address, an internet address, a phone number, etc.) about a business that manufactures a depicted product, a product review (e.g., a review from Consumer Reports® or a similar entity) for a product shown in the media content, etc.

The supplemental database 116 may be integrated with any other available database or data source. For example, the supplemental database 116 may be integrated with the content information database 114. The supplemental database 116 may be implemented using any type of data storage device such as, for example, a standalone database server, a database integrated with the content distributor 108, a file stored on a storage device of the content distributor 108, a file stored on a file server, etc. using, for example, any kind of database such as, for example, an SQL database.

The customer profile database 118 of the illustrated example stores information about consumers using the receiver 104 and other receivers connected to the network 106. For example, the customer profile database 118 may store preferences regarding display of an electronic agent (e.g., whether or not a consumer would like the electronic agent to be displayed), preferences regarding media content (e.g., information about what type of media content a consumer prefers), etc. In addition, the customer profile database 118 may also store buddy list information associated with consumers.

The customer profile database 118 may be integrated with any other available database or data source. For example, the customer profile database 118 may be integrated with the chat database 112. The customer profile database 118 may be implemented using any type of data storage device such as, for example, a standalone database server, a database integrated with the receiver 104, a file stored on a storage device of the receiver 104, a file stored on a file server, etc and using any type of database structure such as, for example, an SQL database.

Figure 2:
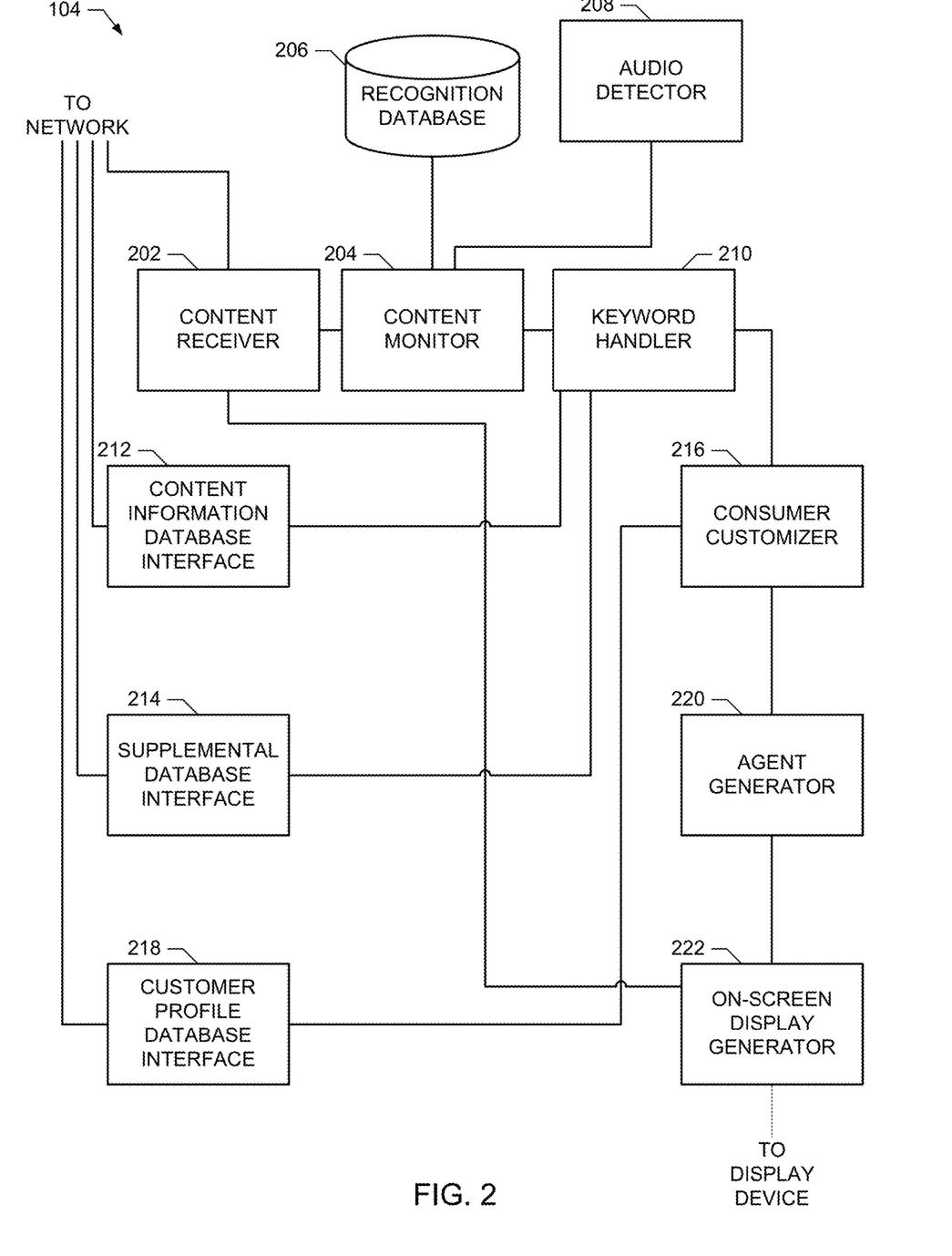
FIG. 2 is a block diagram of an example implementation of the receiver 104 of FIG. 1

FIG. 2 is a block diagram of an example implementation of the receiver 104 of FIG. 1. The example receiver 104 includes a content receiver 202, a content monitor 204, a content recognition database 206, an audio detector 208, a keyword handler 210, a content information database interface 212, a supplemental database interface 214, a consumer customizer 216, a customer profile database interface 218, an agent generator 220, and an on-screen display generator 222.

The content receiver 202 of the illustrated example receives media content from the network 106 of FIG. 1. The content receiver 202 includes network communication circuitry and media decryption and decoding circuitry. The example content receiver 202 transmits received media content to the content monitor 204 and to the on-screen display generator 222.

The content monitor 204 of the illustrated example determines the identity of media content received from the content receiver 202. The example content monitor 204 utilizes media content information transmitted with the media content to determine the identity of the media content. For example, a serial number may be inserted in a content identification field in the header and/or a payload of media content packets. Additionally or alternatively, additional information (e.g., program title, description, characters) may be included in the media content header or in the payload of the media content packets. The content monitor 204 extracts the information and transmits the information to the keyword handler 210. Alternatively, if media content does not include identifying information, the example content monitor 204 uses information stored in the content recognition database 206 and the audio detector 208 to identify the media content. For example, the audio detector 208 may monitor audio output by the display device 102 of FIG. 2 and transmit the audio to the content monitor 204. The content monitor 204 will compare the audio to samples of audio in the content recognition database 206. If the audio matches an audio sample, the content monitor 204 will determine that the media content associated with the audio sample is being presented. The forgoing methods of media content recognition examples and any available or newly developed methods and apparatus for media content recognition may be used. Additionally or alternatively, the content monitor 204 may monitor the media content to recognize information that should be handled by an electronic agent. For example, the audio detector 208 may monitor for the name of a product to be output by the display device 102 of FIG. 1.

The content information database interface 212 of the illustrated example communicatively couples the receiver 104 and the content information database 114. The example content information database interface 212 is capable of creating and/or forwarding requests for information from the content information database 114 and of receiving information from the content information database 114. While the content information database interface 212 is illustrated as a discrete component, the content information database interface 212 may alternatively be implemented in conjunction with a single network interface for the receiver 104 and/or integrated with the supplemental database interface 214 and/or the customer profile database interface 218.

The supplemental information database interface 214 of the illustrated example communicatively couples the receiver 104 and the supplemental information database 116. The example supplemental information database interface 214 is capable of creating and/or forwarding requests for information from the supplemental information database 116 and of receiving information from the supplemental information database 116. While the supplemental information database interface 214 is illustrated as a discrete component, the supplemental information database interface 214 may alternatively be implemented in conjunction with a single network interface for the receiver 104 and/or integrated with the content information database interface 212 and/or the customer profile database interface 218.

The keyword handler 210 of the illustrated example receives identifying information associated with media content from the content monitor 204 and, in conjunction with the content information database interface 212 and the supplemental information database interface 214, retrieves information associated with the media content. In particular, the keyword handler 210 utilizes the identifying information to retrieve keyword information via the content information database interface 212. After receiving the keywords, the keyword handler 210 retrieves information associated with the keywords via the supplemental database interface 214. The keyword handler 210 transmits the information retrieved from the supplemental information database 116 to the consumer customizer 216.

The example consumer customizer 216 receives the information retrieved from the supplemental information database interface 214 and the customer profile information received via the customer profile database interface 218, and performs any desired customization to the information associated with the media content. For example, the consumer customizer 216 may select among multiple selections of information to choose information that is most closely associated with a consumer's preferences, geographic location, etc. For example, if the consumer customizer 216 receives information for pizza delivery and Chinese food delivery, the consumer customizer 216 may determine, based on information received via the customer profile database interface 218, that the customer would prefer information about pizza delivery. Additionally or alternatively, the example consumer customizer 216 may select information for a consumer based on objective criteria such as geographic location. For example, the consumer customizer 216 may select a pizza delivery business that is located near a consumer's physical (e.g., street) address. The consumer customizer 216 may transmit customer profile information to the keyword handler 210 so that the keyword handler 210 can retrieve information associated with the customer profile information. In the illustrated example, the consumer customizer 216 transmits the customized information associated with media content to the agent generator 220.

The customer profile database interface 218 of the illustrated example communicatively couples the receiver 104 and the customer profile database 118. The example customer profile database interface 218 is capable of creating and/or forwarding requests for information to the customer profile database 118 and of receiving information from the customer profile database 118. While the customer profile database interface 218 is illustrated as a discrete component, the customer profile database interface 218 may alternatively be implemented in conjunction with a single network interface for the receiver 104 and/or integrated with the content information database interface 212 and/or the supplemental database interface 214.

The agent generator 220 of the illustrated example receives the customized information associated with media content from the consumer customizer 216 and generates an electronic agent for output by the receiver 104. In the illustrated example, the agent generator 220 generates an animation character that presents the customized information. For example, the agent generator 220 may render an animated of a man with a speech bubble that contains the customized information. In addition, the agent generator 220 may generate audio sound effects or spoken words corresponding to the customized information. The agent generator 220 transmits the generated electronic agent to the on-screen display generator 222. Persons of ordinary skill in the art will recognize that the agent generator 220 may be alternatively implemented by other devices connected to the network 106. For example, the agent generator 220 may be integrated with the content distributor 108. In one implementation of this example, the receiver 104 requests that the content distributor 108 generate an electronic agent for a particular media content. The content distributor 108 retrieves necessary information, generates an electronic agent, and transmits the electronic agent to the receiver 104 for display on the display device 102.

The on-screen display generator 222 receives the generated electronic agent and the media content received by the content receiver 202 and combines them for display on the display device 102 of FIG. 1. For example, the generated electronic agent may be a man with a speech bubble having a transparent background. The on-screen display generator 222 of the illustrated example overlays the man with the speech bubble on the media content (e.g., interactive television media content). In addition, the on-screen display generator 222 may generate a background for display behind the electronic agent and/or may display text information on the screen. The example on-screen display generator 222 also renders user input controls to allow the consumer to interact with the generated electronic agent. For example, the on-screen display generator 222 may generate a button that a consumer can select to request more information about a product for which the electronic agent is presenting information. The on-screen display generated by the on-screen display generator 222 is transmitted to the display device 102 of FIG. 1 and/or to any other attached device for display.

Figure 3:
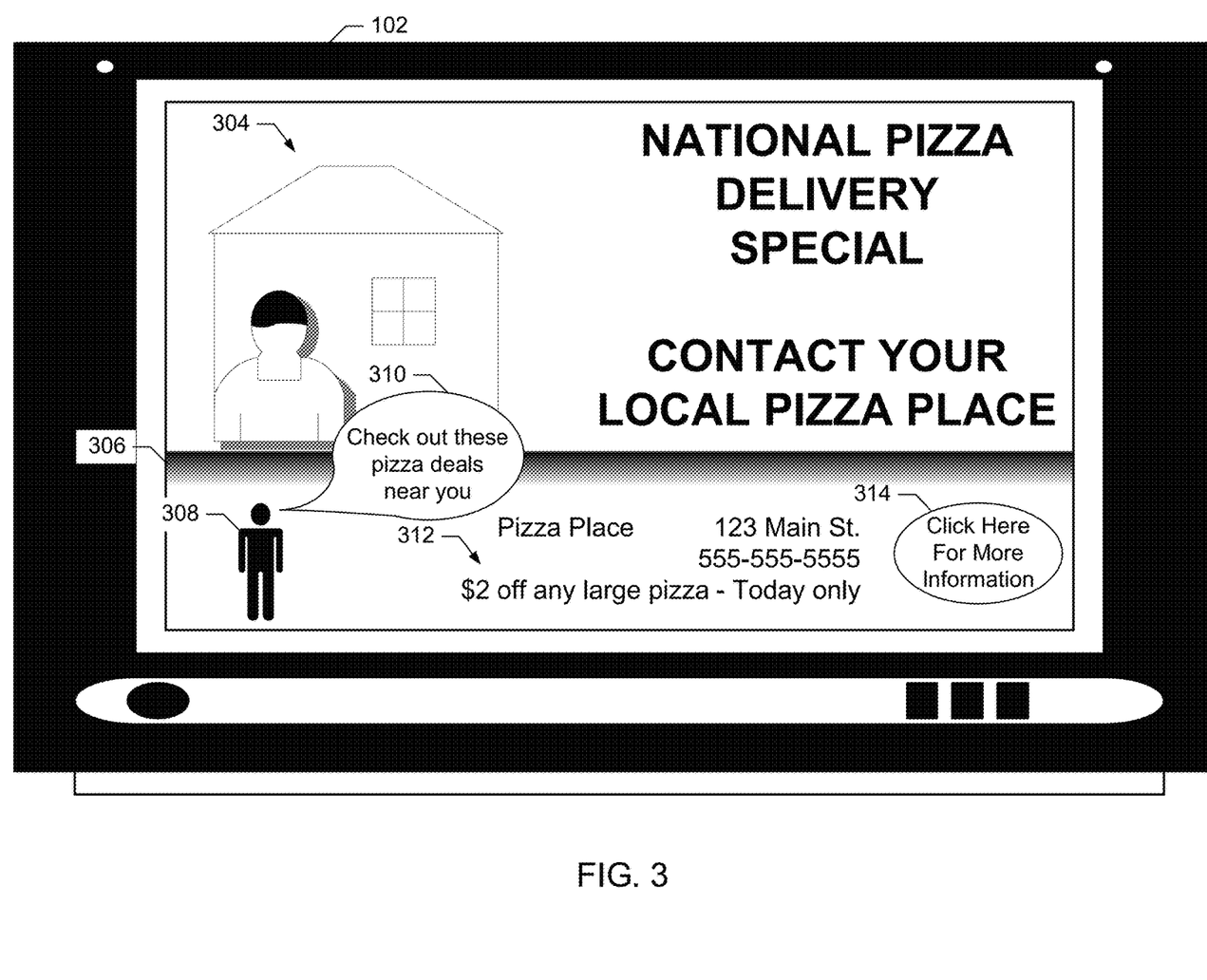
FIG. 3 is an illustration of an example television displaying media content with electronic agent information overlaid.

FIG. 3 is an illustration of an example display device 102 displaying media content 304 with electronic agent information overlaid (e.g., a display bar 306, a character 308, a speech bubble 310, text 312, and a button 314). The media content 304 and electronic agent information are received from the receiver 104 of FIG. 1 as explained above.

In the illustrated example, the media content 304 is an advertisement for a pizza restaurant. In the illustrated example, the display of the media content 304 is adjusted to fit the display bar 306. Alternatively, the media content may be displayed behind the display bar 306 such as how the media content is displayed behind the speech bubble 310. The media content 304 may be any media content that can be identified by the receiver 104 of FIG. 1.

The example display bar 306 is an opaque image that is displayed in the lower portion of the television 102. The display bar 306 provides a background to allow the electronic agent to be distinguished from the media content 304. Of course, in alternative implementations it may not be desirable for the electronic agent to be distinguished from the media content 304 and, accordingly, the display bar 306 may not be displayed.

The example character 308 is illustrated as an image of a person. The example character 308 is an animated character that moves around the screen (e.g., walking, flying, running, hiding behind the display bar 306, hiding at the edges of the screen of the television 102, etc.). As previously described, the character 308 may be any type of displayed image and may be animated or not animated.

The example speech bubble 310 displays text as if it were spoken by the character 308. In addition to displaying the speech bubble 310, the receiver 104 may additionally or alternatively cause the television 102 to present spoken audio of the words shown in the speech bubble 310. The speech bubble 310 may be used to get the attention of a consumer, to convey some information to a consumer, etc.

The example text 312 displays information to consumers. In the illustrated example, the text 312 provides localized information about a national pizza restaurant that is near the consumer. In addition, the text 312 provides information about a special ordering deal that is available to consumers viewing the electronic agent. The text 312 may not be displayed if all information to be presented is displayed in the speech bubble 310 or presented as audio.

The example button 314 allows a user to interact with the electronic agent. In the illustrated example, the button 314 allows a user to request further information regarding information presented by the character 308, the speech bubble 310, and/or the text 312. Alternatively, the button 314 may allow a user to request that a phone call be initiated between the consumer and the pizza restaurant/delivery franchise. For example, if the receiver 104 includes telecommunications capabilities (e.g., voice over internet protocol (VoIP) communications, public switched telephone network (PSTN) communications, etc.), the receiver 104 will initiate a phone call with the pizza restaurant/delivery franchise and then cause the consumer's telephone to ring with the same connection. The button 314 may alternatively be implemented as a form that allows the user to input information (e.g., using a remote control or a keyboard), as a voice activated input (e.g., a message is displayed on the screen requesting the user to speak the input), etc. The button 314 may allow consumers to respond to a voting request, respond to a survey, purchase products using electronic commerce, participate in an interactive television program, etc.

A flowchart representative of example machine readable instructions for implementing the system 100 of FIG. 1 is shown in FIGS. 4-8. In the example flowcharts, the machine readable instructions comprise a program for execution by a processor such as the processor 912 shown in the example computer 900 discussed below in connection with FIG. 9. The program may be embodied in software stored on a tangible medium such as a CD-ROM, a floppy disk, a hard drive, a digital versatile disk (DVD), or a memory associated with the processor 912, but persons of ordinary skill in the art will readily appreciate that the entire program and/or parts thereof could alternatively be executed by a device other than the processor 912 and/or embodied in firmware or dedicated hardware in a well known manner. For example, any or all of the receiver 104, the content distributor 108, the chat controller 110, the content receiver 202, the content monitor 204, the audio detector 208, the keyword handler 210, the consumer customizer 216, the agent generator 220, and the on-screen display generator 222 could be implemented by software, hardware, and/or firmware. Further, although the example program is described with reference to the flowcharts illustrated in FIGS. 4-8, persons of ordinary skill in the art will readily appreciate that many other methods of implementing the system 100 may alternatively be used. For example, the order of execution of the blocks may be changed, and/or some of the blocks described may be changed, eliminated, or combined.

Figure 4:
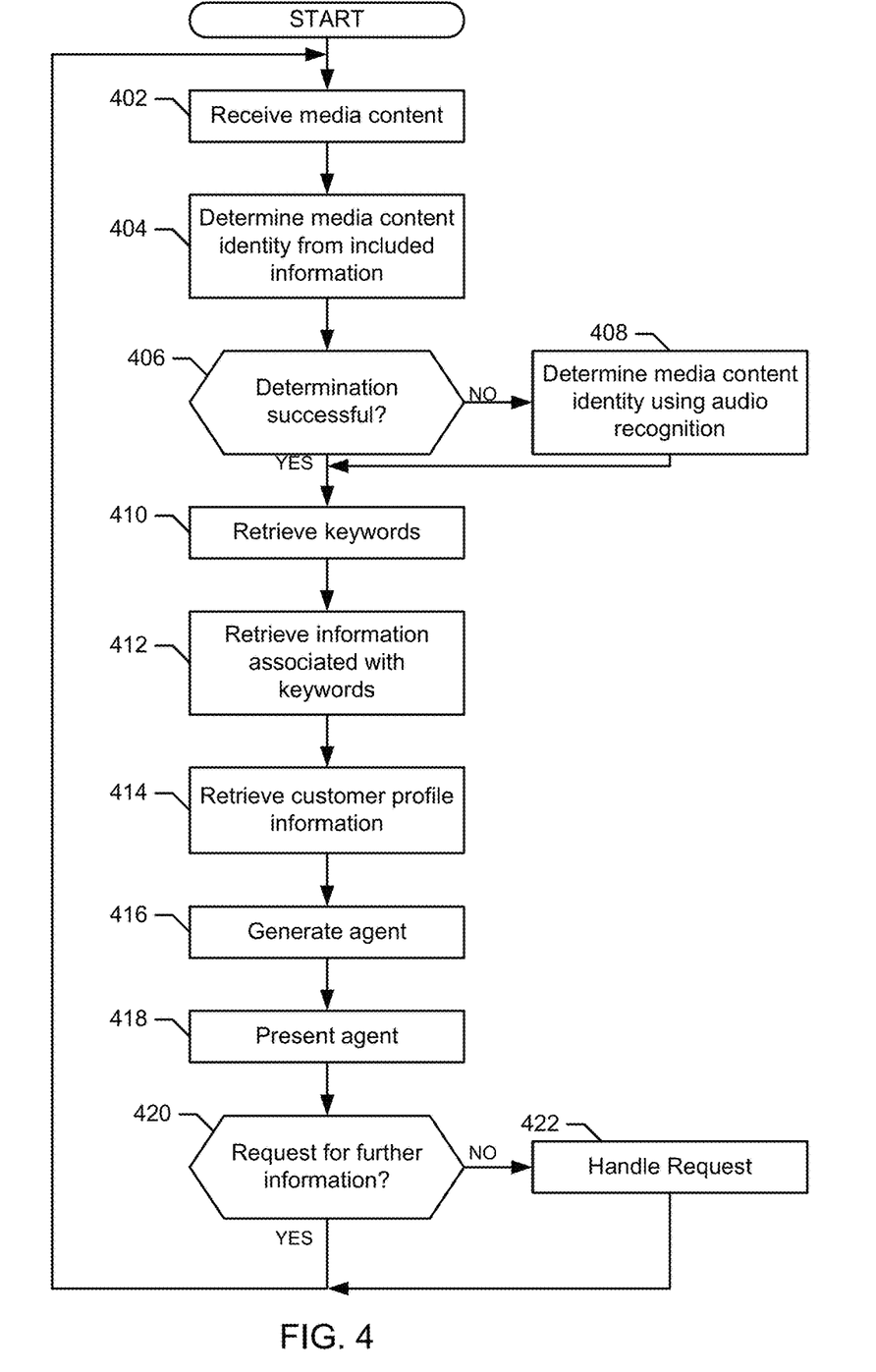
FIG. 4 is a flowchart representative of example machine readable instructions for implementing the receiver of FIG. 1.

FIG. 4 is a flowchart representative of example machine readable instructions for implementing the receiver 104 of FIG. 1. The machine readable instructions of FIG. 4 begin when the content receiver 202 of the receiver 104 of FIG. 1 receives media content from the network 106 (block 402). The content monitor 204 then determines the identity of the received media content (block 404). The content monitor 204 or the keyword handler 210 then determines if the determination of the identity of the received media content is successful (block 406). If the determination of the identity of the received media content is not successful (block 406), then the audio detector 208 monitors the audio output by the display device 102 to identify the media content (block 408).

If the determination of the media content is successful (block 406) or after the audio detector 208 identifies the media content (block 408), the keyword handler 210 retrieves the keywords associated with the identified media content via the content information database interface 212 (block 410). When the keywords are received, the keyword handler 210 uses the keywords to query the supplemental information database 116 via the supplemental database interface 214 (block 412). When the supplemental information is received, the consumer customizer 216 retrieves customer profile information via the customer profile database 218 and customizes the information retrieved by the keyword handler 210 (block 414). Next, the agent generator 220 generates the electronic agent using the customized information from the consumer customizer 216 (block 416). The electronic agent and/or the media content is then presented on the display device 102 by the on-screen display generator 222 (block 418).

After presenting the electronic agent, the receiver 104 determines if a consumer has requested further information from the electronic agent (block 420). If the consumer does not request further information, control returns to block 402 to continue monitoring for keywords. If the consumer does request further information, the receiver 104 communicates with the network 106 to handle the request and/or present further information. Then, control returns to block 402 to continue monitoring for keywords.

Figure 5:
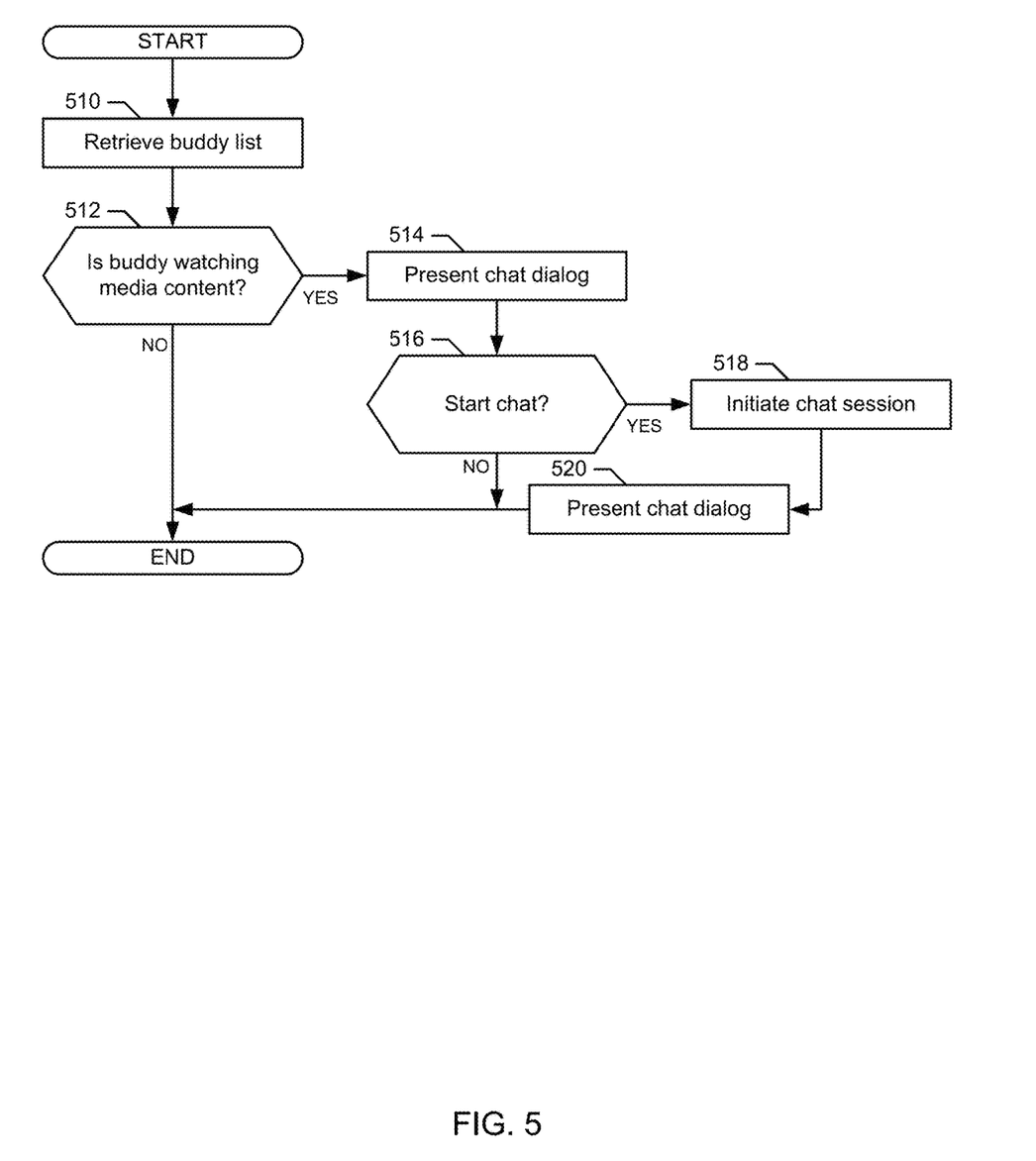
FIG. 5 is a flowchart representative of example machine readable instructions for implementing the receiver of FIG. 1.

FIG. 5 is a flowchart of example machine readable instructions that may supplement the machine readable instructions illustrated in FIG. 4. In particular, blocks 510-520 may be substituted for blocks 410-422, may execute simultaneously with blocks 410-422, may execute after blocks 410-422, or may execute before blocks 410-422. After the content monitor 204 determines the identity of media content received from the content receiver 202, the consumer customizer 216 requests a buddy list associated with a consumer of the media content (block 510). The consumer customizer 216 may request the buddy list via the customer profile database interface 218, which may request the buddy list from the chat controller 110 and the chat database 112 or the customer profile database 118. Alternatively, the consumer customizer 216 may utilize a buddy list that is stored at the receiver 104.

The consumer customizer 216 then queries the chat controller 110 to determine if another consumer on the retrieved buddy list is consuming media content associated with the media content at the receiver 104 (block 512). For example, the other consumer may be consuming the same media content as the receiver 104 is presenting. If none of the consumers on the retrieved buddy list are consuming media content associated with the media content at the receiver 104, the machine readable instructions return to processing received media content (e.g., control returns to block 402 to continue monitoring for keywords.

If the chat controller 110 indicates that one or more of the consumers on the buddy list are watching media content associated with the media content at the receiver 104, the agent generator 220 determines if a chat session should be initiated (block 514). For example, the agent generator 220 presents a chat confirmation message on the display device 102. The chat confirmation message may present a message box requesting the consumer's confirmation to initiate a chat session. In addition, the agent generator 220 may determine how much time has elapsed since the last chat confirmation message was displayed. If the elapsed time is below a predetermined threshold the agent generator 220 may use the user's most recent answer (e.g., the user selected to not start a chat less than 30 seconds ago) in determining whether to initiate a chat session. The consumer customizer 216 then determines if the consumer confirmed the chat initiation (block 516). If the consumer does not confirm the chat initiation after a predetermined time period (e.g., 20 seconds), the machine readable instructions return to processing received media content (e.g., control returns to block 402 to continue monitoring for keywords. Additionally, the agent generator 220 may continue to present a chat confirmation periodically.

If the consumer confirms the chat initiation (block 516), the consumer customizer 216 requests that the chat controller 110 initiate a chat session with the one or more consumers on the buddy list consuming media content associated with the media content at the receiver 104 (block 518). The agent generator 220 then presents a chat dialog box on the display device 102 (block 520). The consumer then uses a keyboard or any other input device to communicate in the chat dialog box. Then, the machine readable instructions return to processing received media content (e.g., control returns to block 402 to continue monitoring for keywords.

Figure 6:
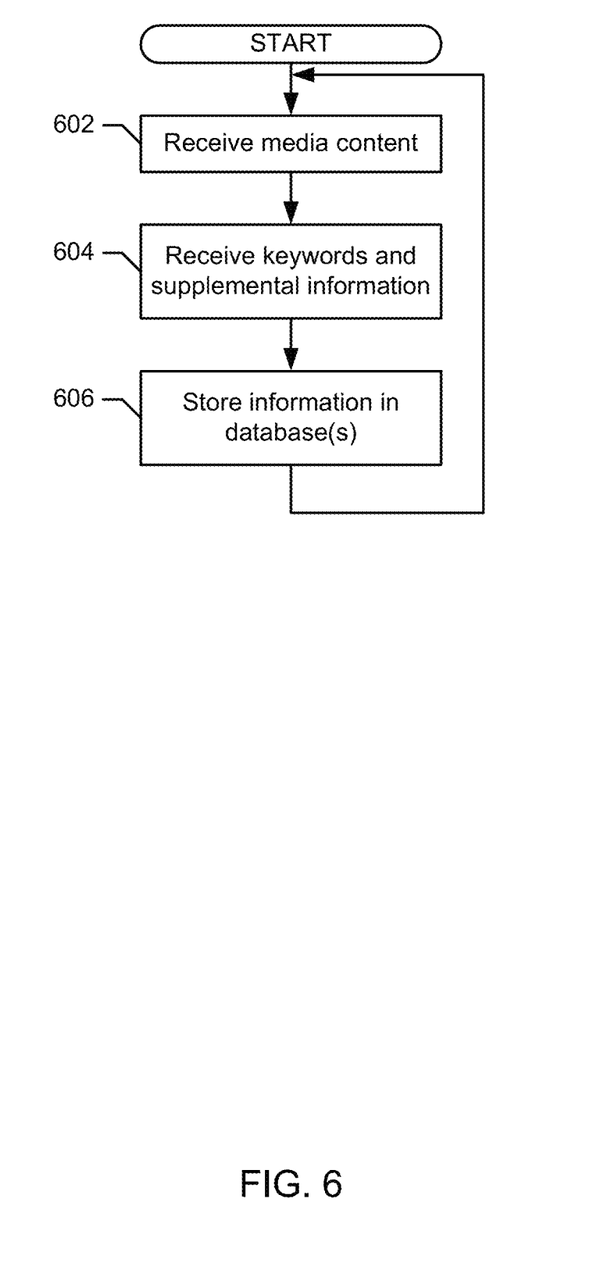
FIG. 6 is a flowchart representative of example machine readable instructions for implementing the content distributor of FIG. 1.

FIG. 6 is a flowchart representative of example machine readable instructions for receiving media content at the content distributor 108 of FIG. 1. The machine readable instructions of FIG. 6 begin when the content distributor 108 receives media content from a content generator/creator (block 602). The content distributor 108 then receives and/or generates keywords, identifiers, and/or supplemental information for the media content (block 604). The content distributor 108 then stores the keywords, identifiers, and/or supplemental information in an appropriate database (e.g., a database connected to the network 106) (block 606). For example, the content distributor 108 may store keyword and/or identifier information in the content information database 114 and supplemental information in the supplemental information database 116. Control then returns to block 602 to continue receiving media content.

Figure 7:
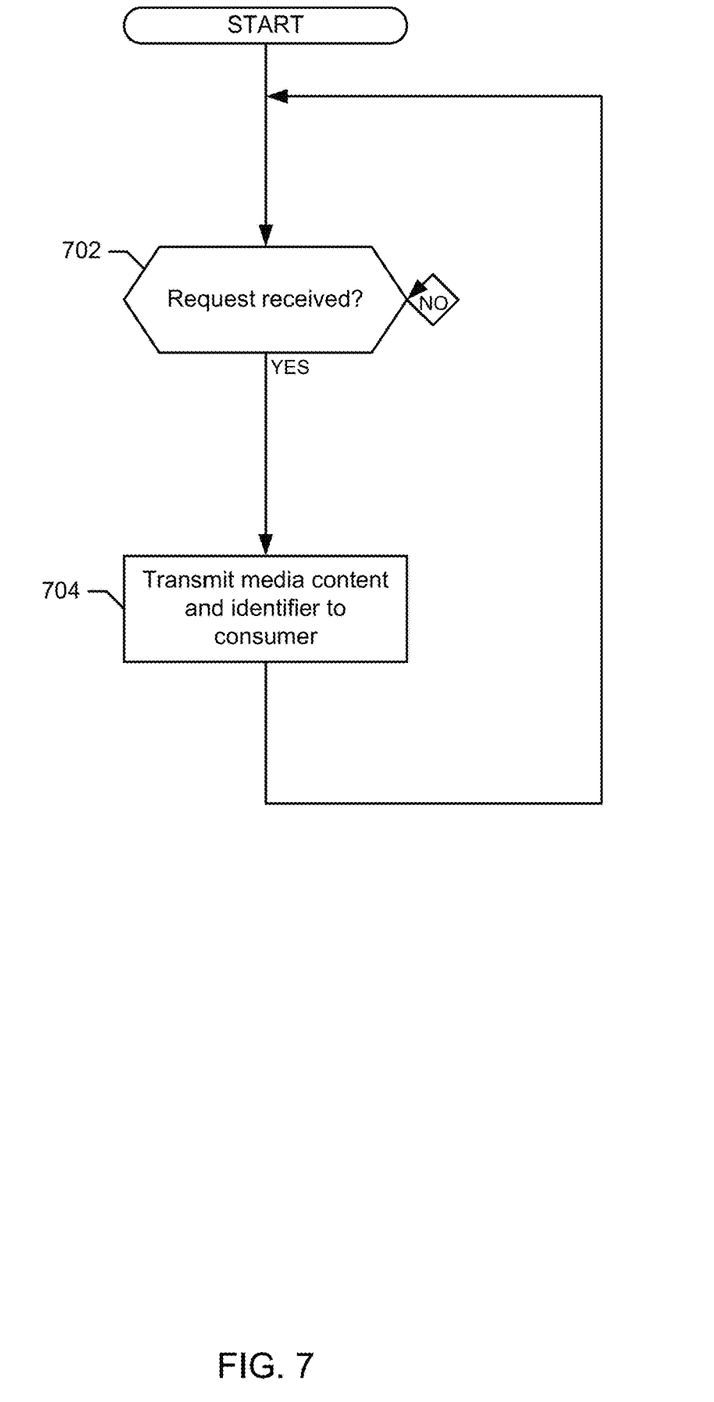
FIG. 7 is a flowchart representative of example machine readable instructions for implementing the content distributor of FIG. 1.

FIG. 7 is a flowchart representative of example machine readable instructions for sending media content to consumers from the content distributor 108 of FIG. 1. The machine readable instructions of FIG. 7 begin when the content distributor 108 determines if a request for media content has been received from the receiver 104 (block 702). If the content distributor 108 has not received a request for media content, the content distributor 108 continues to monitor for a request. If the content distributor 108 has received a request for media content (e.g., a request to transmit media content, to allow the receiver 104 to join a multicast stream, etc.), the content distributor transmits the media content and an associated identifier (e.g., serial number) to the receiver 104 via the network 106 (block 704). Control then returns to block 704 to continue monitoring for media content requests.

Figure 8:
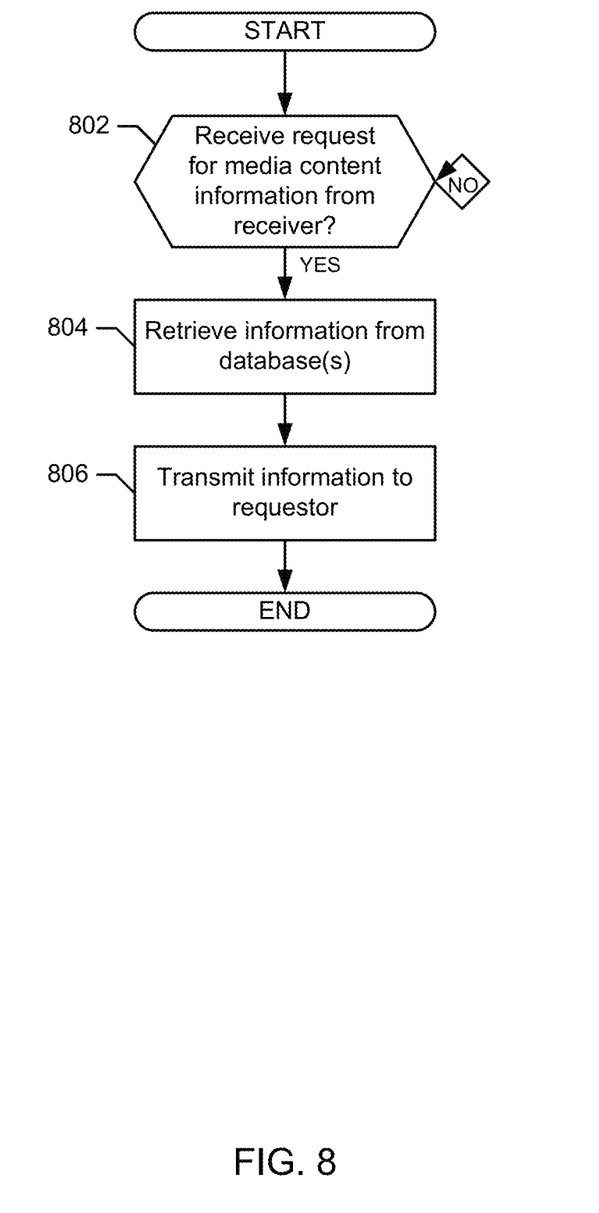
FIG. 8 is a flowchart representative of example machine readable instructions for implementing the content distributor of FIG. 1.

FIG. 8 is a flowchart representative of example machine readable instructions for sending media content information to a consumer location. The machine readable instructions of FIG. 8 being when the content distributor 108 or any other device connected to the network 106 determines if a request for media content information has been received from the receiver 104 (block 802). If the content distributor 108 has not received a request for media content information, the content distributor 108 continues to monitor for such a request. If the content distributor 108 has received a request for media content information, the content distributor 108 retrieves the requested information from available database(s) (block 804). For example, the content distributor 108 may retrieve keyword information from the content information database 114 and supplemental information from the supplemental database 116. The content distributor 108 then transmits the requested information to the receiver 104 for us in generating an electronic agent (block 806). Control then returns to block 802 to continue monitoring for requests for media content information.

Figure 9:
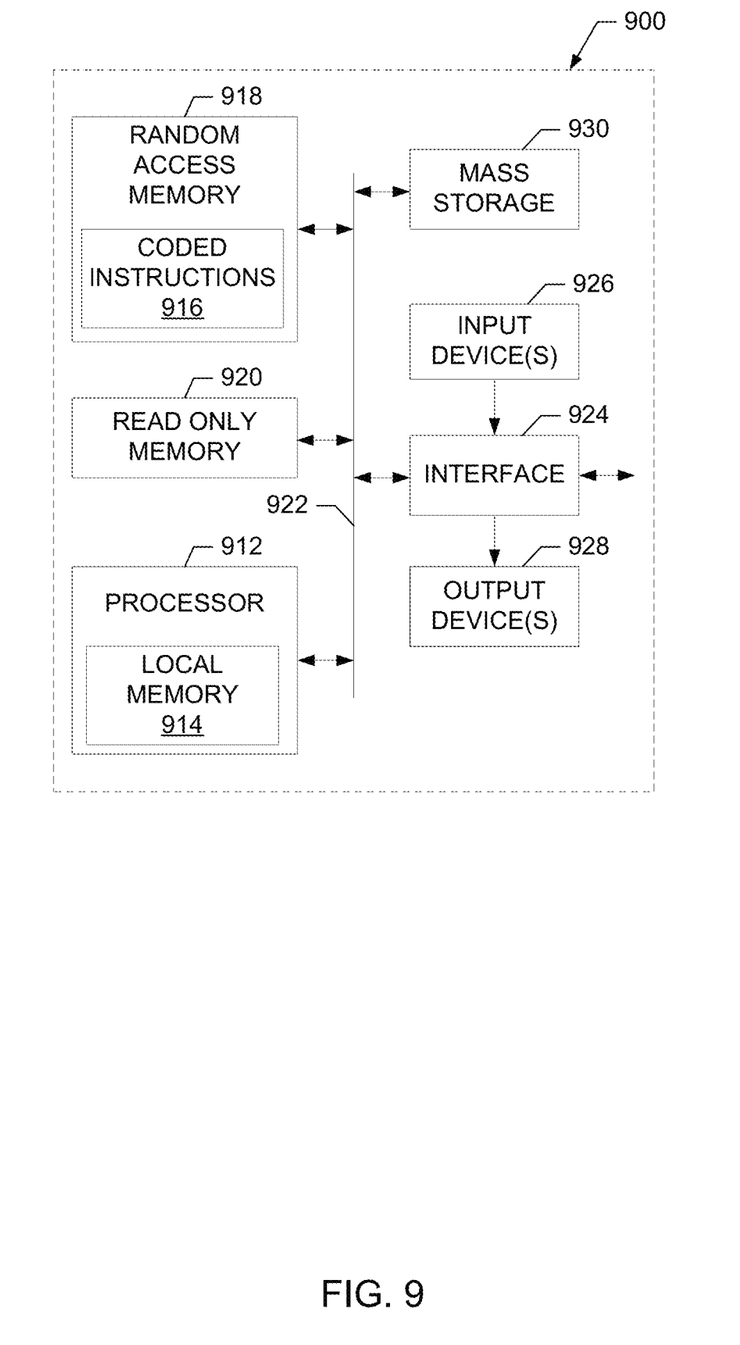
FIG. 9 is an example processor system that may execute the machine readable instructions represented by FIGS. 4-6 to implement the example methods and apparatus described herein.

FIG. 9 is a block diagram of an example computer 900 capable of executing the machine readable instructions represented by FIGS. 4-8 to implement the apparatus and/or methods disclosed herein. The computer 900 can be, for example, the receiver 104, the content distributor 108, the chat controller 110, the content receiver 202, the content monitor 204, the audio detector 208, the keyword handler 210, the consumer customizer 216, the agent generator 220, the on-screen display generator 222 and/or any part thereof.

The system 900 of the instant example includes a processor 912 such as a general purpose programmable processor. The processor 912 includes a local memory 914, and executes coded instructions 916 present in the random access memory 918 and/or in another memory device. The processor 912 may execute, among other things, the machine readable instructions illustrated in FIGS. 4-8. The processor 912 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 912 is in communication with a main memory including a volatile memory 918 and a non-volatile memory 920 via a bus 922. The volatile memory 918 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 920 may be implemented by flash memory and/or any other desired type of memory device. Access to the main memory 918, 920 is typically controlled by a memory controller (not shown) in a conventional manner.

The computer 900 also includes a conventional interface circuit 924. The interface circuit 924 may be implemented by any type of well known interface standard, such as an Ethernet interface, a universal serial bus (USB), and/or a third generation input/output (3GIO) interface.

One or more input devices 926 are connected to the interface circuit 924. The input device(s) 926 permit a user to enter data and commands into the processor 912. The input device(s) can be implemented by, for example, a keyboard, a mouse, a touchscreen, a track-pad, a trackball, isopoint and/or a voice recognition system.

One or more output devices 928 are also connected to the interface circuit 924. The output devices 928 can be implemented, for example, by display devices (e.g., a liquid crystal display, a cathode ray tube display (CRT), a printer and/or speakers). The interface circuit 924, thus, typically includes a graphics driver card.

The interface circuit 924 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 900 also includes one or more mass storage devices 930 for storing software and data. Examples of such mass storage devices 930 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus for presenting an electronic agent, the apparatus comprising:
   a media receiver to receive media to present via a display device;
   a media monitor to determine an identity of the media;
   a keyword handler to, in response to the identity of the media, retrieve a list including a keyword associated with the identified media, the keyword handler to access a first database using the keyword to retrieve an advertisement associated with the keyword; and
   an agent generator to generate audio to be emitted that corresponds to text presented via an interactive electronic agent displayed on the display device, the text to be displayed via a speech bubble displayed on the display device.

2. The apparatus of claim 1, wherein the keyword handler is to access the first database using the keyword to retrieve at least two advertisements associated with the keyword, and further including a consumer customizer to identify user profile information, the consumer customizer to select one of the at least two advertisements based on a proximity of a business represented in the presented text to a location identified in the user profile information.

3. The apparatus of claim 1, wherein the interactive electronic agent is an animated character displayed on display device.

4. The apparatus of claim 1, wherein the media is an internet protocol television program.

5. The apparatus of claim 1, wherein the keyword handler is to retrieve second information associated with the presented text based on a user input.

6. The apparatus of claim 5, wherein the second information is from the first database.

7. The apparatus of in claim 5, wherein the second information is from a second database different from the first database.

8. The apparatus of claim 1, wherein the agent generator is further to at least one of provide a visual presentation of the advertisement or provide an audible presentation of the advertisement.

9. The apparatus of claim 1, wherein the list includes at least one of information about an entity associated with the media, information about a location depicted in the media, information about a character depicted in the media, or a product review associated with a product depicted in the media.

10. The apparatus of claim 1, wherein the agent generator is to send a request to initiate an online chat session associated with the media.

11. The apparatus of claim 10, wherein:
    the chat session enables a first participant and a second participant to interact; and
    the first participant is identified on a buddy list of the second participant.

12. A system comprising:
    a hardware receiver located at an information presentation location to access media, the hardware receiver to request information about the media from a distributor; and
    the distributor to (i) associate a list of keywords with an interactive television program, (ii) receive a request for information accessible via the keywords from the hardware receiver, (iii) access a first database using at least one of the keywords, and (iv) forward information retrieved from the first database to the hardware receiver, the information to cause the hardware receiver to generate audio to be emitted that corresponds to text presented via a speech bubble displayed on a display device.

13. The system of claim 12, wherein the information from the first database includes at least two advertisements associated with the at least one of the keywords, and the receiver is to select one of the at least two advertisements based on a proximity of a business represented in the presented text to a location identified in user profile information.

14. The system as defined in claim 12, wherein the distributor is further to transmit the media to the receiver.

15. The system as defined in claim 12, wherein the list of keywords is received from a creator of the media.

16. The system as defined in claim 15, wherein the distributor is further to receive the media from the creator of the media.

17. The system as defined in claim 12, wherein the first database is a business directory.

18. The system as defined in claim 12, wherein the receiver is located at a consumer location.

19. The system as defined in claim 12, wherein the receiver is further to:
    access customer profile information; and
    customize the information from the first database based on the customer profile information.

20. The system as defined in claim 12, wherein the distributor is further to receive a request for additional information in response to transmitting the information retrieved from the first database to the receiver.

* * * * *